United States Patent [19]

Lörsch

[11] 4,058,308
[45] Nov. 15, 1977

[54] APPARATUS FOR STACKING SUBSTANTIALLY FLAT ARTICLES

[76] Inventor: Johannes Lörsch, An der Bleiche 49, D-4172 Straelen, Germany

[21] Appl. No.: 673,870

[22] Filed: Apr. 5, 1976

[30] Foreign Application Priority Data

Apr. 11, 1975 Germany .............................. 2515789

[51] Int. Cl.² ........................................... B65H 29/40
[52] U.S. Cl. ................................... 271/178; 271/187
[58] Field of Search .................. 271/178, 179, 80, 187

[56] References Cited

U.S. PATENT DOCUMENTS

| | | | |
|---|---|---|---|
| 582,593 | 5/1897 | Waite | 271/178 |
| 1,183,761 | 5/1916 | Parrish | 271/178 |
| 1,269,673 | 6/1918 | Armstrong | 271/178 |
| 3,166,313 | 1/1965 | Rehm | 271/178 |
| 3,325,165 | 6/1967 | Davis | 271/178 |
| 3,584,869 | 6/1971 | Traphagen | 271/178 |

*Primary Examiner*—Richard A. Schacher
*Attorney, Agent, or Firm*—Lowe, King, Price & Markva

[57] ABSTRACT

An apparatus for stacking transparency frames, or other substantially flat articles, comprises a rotating cam body located between a feed-in arrangement and a receivng arrangement. The cam body is synchronized to the movement of the transparency frames on the feed-in arrangement, and guides the frames into a receiving shaft that forms a portion of the receiving arrangement. The rotating cam body provides continuous guidance to the transparency frames during movement between the feed-in and receiving arrangements. As a result, breakdowns during stacking are minimized. In one embodiment, the receiving arrangement is disposed transversely with respect to the feed-in arrangement. The cam body comprises a pair of cam discs having a circular sector configuraion. The arc length of the sector is synchronized to the spacing between the transparency frames on the feed-in arrangement. In a second embodiment, the feed-in arrangement and receiving arrangement are located in line to each other. The cam discs each contains receiving and reversing recesses that clamp an in-fed transparency frame. As the cam body is rotated, the frame is stacked in a position transverse to the direction of movement of the in-fed frames.

4 Claims, 3 Drawing Figures

APPARATUS FOR STACKING SUBSTANTIALLY FLAT ARTICLES

BACKGROUND OF THE INVENTION

1. Field of the Invention

The invention relates generally to an apparatus for stacking planar or substantially flat articles, and more particularly to an apparatus for successively stacking transparency frames or other substantially flat articles into a receiving shaft.

2. Description of Prior Art

In the manufacture of photographic slides, a stacking mechanism is often provided in conjunction with sorting machines for transparency frames, or with lettering machines for the frames. Generally, such stacking mechanisms are used whenever planar articles are manufactured or subjected to individual treatment, and then disposed or stacked in, for example, a magazine. In one type of prior art stacking mechanism, rubber bands follow a conveyor belt on which the planar articles or transparency frames are guided and from which they drop freely into a magazine, a stacking shaft etc. This dropping movement, however, is uncontrolled, and frequently leads to breakdowns.

In another known stacking mechanism, an arrangement has been provided to prevent the dropping movement from being carried out completely uncontrolled. The arrangement consists of guide members disposed in the area of the trajectory of the transparency frames to move the transparency frames from a horizontal position into a vertical position along a sector of a circular arc. This arrangement, too, is not wholly satisfactory, since the effect of the guiding arrangement is, among other factors, greatly dependent on the speed and the mass of the transparency frames. Whenever the speed of the transparency frames is too low, the guide members are not contacted. Whenever the speed is too high, the transparency frames rebound from (bounce off) the guide members.

SUMMARY OF THE INVENTION

In accordance with a broad aspect of the invention, a stacking mechanism for transparency frames, or other planar or substantially flat articles, provides continuous guidance to the transparency frames during movement so that the transparency frames being stacked are not subjected to any substantial changes in speed. Thus, the deleterious effect of additional forces, such as weight or rebounding actions, is avoided. Between the ends of a feed-in arrangement and a receiving arrangement, a rotatably disposed cam body acting as a take-over and reversing arrangement is provided. The cam body is synchronized in its rotational movement to the movement of the feed-in arrangement. The cam body has at least one curved guide portion that is maintained in abutment to the reversed, planar article to force the latter into a receiving shaft. The rotational axis of the cam body is disposed essentially parallel to the plane of the in-fed planar article, and is disposed transversely to the direction of travel of the feed arrangement.

The cam body comprises two cam discs separted from each other on the rotational axis by a distance corresponding to at least the width of opening of the picture gate of a transparency frame. This distance is particularly effective for stacking transparency frames. Preferably, the guide portion of the cam body is curved in the form of an arc. This form of a curve can be produced particularly easily.

An elastic back-biasing arrangement for stacked articles is disposed in the stacking region of the stacking mechanism. This back-biasing arrangement is effective whenever no guarantee is given, e.g., by forces of weight (as in the case of a vertical receiving shaft) that the transparency frames put into the stacking region will remain standing in the desired stacking position.

In one embodiment of the invention, the feed-in arrangement and the receiving arrangement are disposed transversely in relation to one another and the cam discs are formed approximately in the shape of an arc of a circular sector. The length of the arc of the circular sector is synchronized with the spacing between the transparency frames being advanced by the feed-in arrangement so that the guiding portion of the cam discs is maintained against the last transparency frame moved into the receiving arrangement until a subsequent transparency frame reaches the area of the receiving arrangement.

In the area of the front end of the receiving arrangement facing the cam body, a guide member is provided extending outwardly from the feed-in arrangement and transversely to the receiving arrangement, with the cam discs passing through apertures formed in the guide members. The feed-in arrangement includes an endless, revolving guide conveyor belt, and the axis of rotation of the cam discs also functions as the axis of rotation of one of the reversing rolls of the conveyor belt. This represents a relatively simple type of construction, especially where the feed-in and receiving arrangements are disposed transversely to one another, and the length of the feed-in arrangement is short.

In a second embodiment of the invention, the feed-in arrangement and the receiving arrangement are disposed in line to one another. The stacked position of the planar articles is transverse to the plane of the in-fed articles. The cam body includes two cam discs separated from each other on a rotational axis. Each disc has receiving and reversing (deflecting) recesses for the transparency frames disposed in the direction of rotation in front of the curved guide area. The cam discs extend through recesses in a bottom plate of the receiving arrangement that, in turn, project up to at least the area of the receiving and reversing (deflecting) recesses.

The receiving and reversing recesses are shaped so as to have a smooth, sliding area and a successive, groove-shaped, clamping area. The surface of the clamping area opposite the sliding area contains a bevel. The bevel serves the purpose of alleviating the introduction of the transparency frame into the clamping area. This arrangement operates in such a way that one transparency frame always fits against the bottom plate of the receiving arrangement after the reversing process, and is then freed from the clamping arrangement during continued movement of the cam disc. The frame is finally pressed simultaneously through the succeeding arc-shaped or circular sector-shaped guide area against the stack that is resiliently biased by the back-biasing arrangement.

Several receiving and deflecting recesses and curve-shaped guide areas may be distributed over the periphery of the cam discs. This depends on the circumference of the cam discs, the size of the transparency frames, the distance between the transparency frames on the feed-in arrangement, and other criteria.

OBJECTIVES OF THE INVENTION

Accordingly, a primary object of the invention is to provide a new and improved apparatus for stacking planar or substantially flat articles.

Another object of the invention is to provide a new and improved apparatus for stacking planar articles that are rigid at least in the region of the edges thereof.

Another object of the invention is to provide an apparatus for guiding movement of planar articles from a feed-in arrangement to a receiving arrangement.

Still another object of the invention is to provide an apparatus for guiding movement of substantially flat articles from a feed-in arrangement to a stacking shaft that is positioned transversely with respect to the feed-in arrangement.

Yet another object of the invention is to provide an apparatus for guiding movement of planar articles from a feed-in arrangement to a stacking shaft located in-line to the feed-in arrangement.

Still another object of the invention is to provide an apparatus for guiding movement of planar articles from a feed-in arrangement to an in-line stacking shaft, wherein the articles are stacked perpendicular to the in-fed articles.

Another object of the invention is to provide an apparatus for guiding movement of planar articles from a feed-in arrangement to a receiving arrangement, wherein a rotatably mounted, cam body is synchronized to movement of the in-fed articles.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENTS

Figure 1:
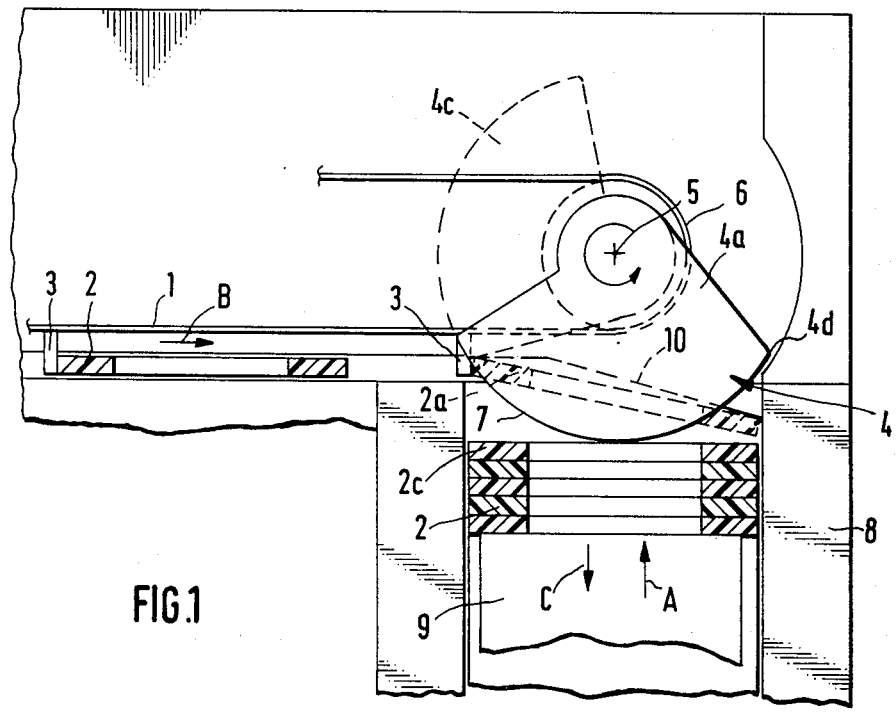
FIG. 1 is a schematic top view of one embodiment of the invention with an upper supporting portion removed wherein transparency frames standing upright are fed into a receiving shaft disposed transversely to the feeding-in arrangement.
Figure 2:
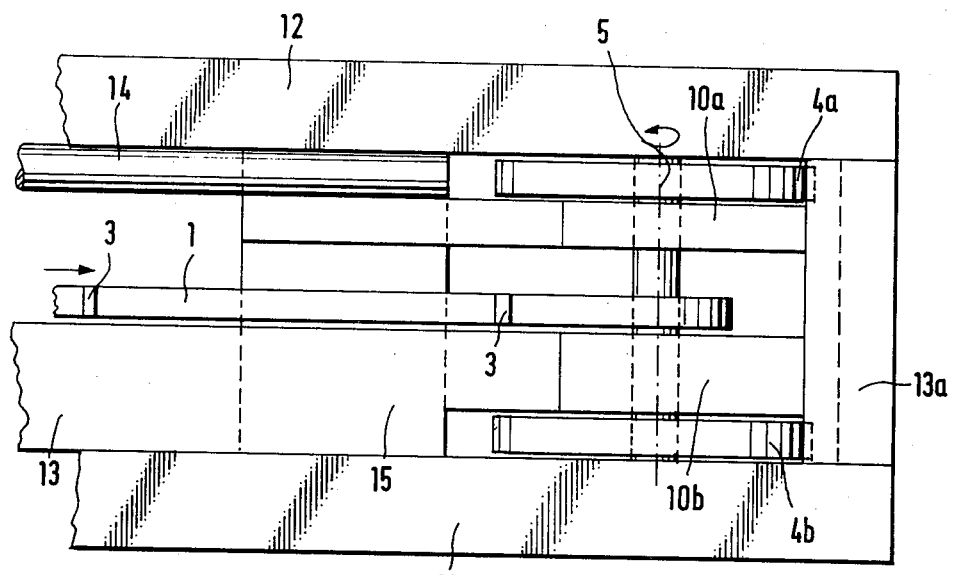
FIG. 2 is a bottom view of the apparatus shown in FIG. 1, with the receiving shaft removed.

Referring to FIGS. 1 and 2, a feeding-in arrangement comprising an endless revolving conveyor belt 1 is provided for carrying transparency frames 2. The frames 2 are fed by drivers 3 to a cam body 4 acting as a take-over and deflecting arrangement. The cam body 4 is mounted for rotation on an axis of rotation 5 which is also the axis of rotation for one of the deflecting rolls 6 of the conveyor belt 1.

The cam body 4 comprises two cam plates or discs 4a and 4b disposed on the axis of rotation 5. The distance between the cam discs on the axis of rotation 5 corresponds at least to the width of opening of the picture gate of a transparency frame 2. Each cam disc 4a and 4b is provided with guide areas 7 shaped in the form of a curve which, in the embodiment shown, are made in the form of a circular arc. Furthermore, a shaft 8 for receiving stacked transparency frames 2 contains an elastic, back-biasing arrangement 9, biased against the frames in the direction of the arrow A.

The stacking process is as follows. The transparency frames 2, which are moved in the direction of the arrow B, are guided by driver 3 toward receiving shaft 8. In the area of the mouth of the receiving arrangement 8 facing the cam body 4, a conducting arrangement or guide member 10 extends from the feeding-in arrangement 1 toward the receiving arrangement 8, and on a slant.

Guide member 10 comprises upper and lower guide members 10a and 10b. As a result of the guide member 10, in-fed transparency frame 2 is guided transversely and assumes the position of the transparency frame 2a (shown in broken lines) in FIG. 1. The position of the cam discs 4a and 4b is likewise shown in a broken line in FIG. 1 and is designated by 4c. Whenever a transparency frame 2 assumes the position 2a, the cam discs assume the position 4c. As the cam discs 4a and 4b are rotated as shown in FIG. 1, the corner 4d seizes the transparency frame 2. Subsequently, the circular arc-shaped guide area slides off on the transparency frame 2a or slides across it, so that the transparency frame is brought gently and continuously into the position designated by 2c. By the action of the guide surface 7, a force is exerted in the direction of the arrow C on the stack of the transparency frames 2. This force is opposite the force of back-biasing arrangement 9 acting in the direction A. The length of the curve-shaped guide area 7 is selected such that said area presses against the transparency frame in position 2c until the next following transparency frame 2 has been brought into the position 2a as a result of the action of the driver.

As can be seen from FIG. 2, the stacking mechanism is generally disposed in a frame having a lower support part 11, an upper support part 12 and a lateral support part 13a. Furthermore, in FIG. 2, lower guide rails 13 and upper guide rails 14, as shown, serve to guide the transparency frames 2 in the feed-in arrangement 1. These guide rails 14 are followed by guide arrangements 10a and 10b. A spacer and support element 15 serves as a spacer for the parts 11 and 12, as well as for the attachment of the guide members 10a and 10b.

Figure 3:
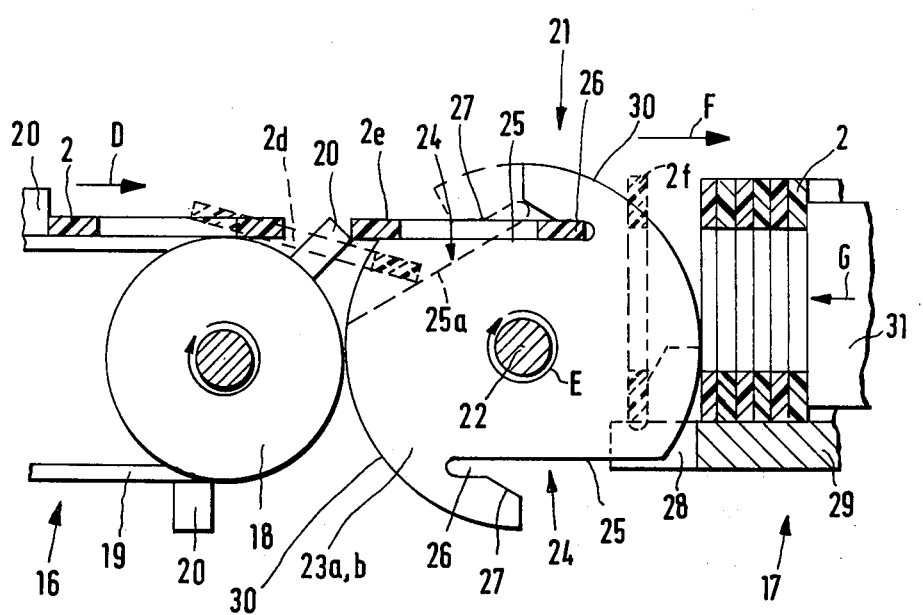
FIG. 3 shows a side sectional view of another embodiment of the apparatus according to the invention, wherein the feed-in arrangement and the receiving arrangement are disposed in the same direction, and the stacking position of the transparency frames is transverse to the plane of the in-fed transparency frames.

Referring now to FIG. 3, a stacking arrangement for transparency frames 2 is shown wherein a feed-in arrangement 16 and a receiving arrangement 17 for the stacked transparency frames 2 are disposed in line to each other. As can be seen, the stacking position of the transparency frames 2 in the receiving arrangement 17 is transverse to the plane of the transparency frames as they are advanced on the feed-in arrangement 16. The feed-in arrangement 16, in turn, has an endless revolving conveyor belt 19 with drivers 20 guided by way of deflecting rolls (one deflecting roll 18 is shown). Between the end of the feed-in arrangement 16 and the receiving arrangement 17, a cam body 21 functions as a take-over and receiving arrangement.

Cam body 21, rotatably mounted on an axis of rotation 22, comprises cam discs 23a and 23b disposed on the axis of rotation. The rotational movement of the cam body 21 is synchronized with the movement of the in-fed transparency frames 2 in the direction of the arrow D. The cam discs 23a and 23b have receiving and deflecting recesses 24 which, in turn, always have a flat sliding area 25 and a groove-shaped clamping area 26 immediately succeeding thereafter. In the arrangement shown in FIG. 3, two receiving and deflecting recesses 24 are distributed over the peripheries of cam discs 23a and 23b.

The operation of the apparatus shown in FIG. 3 is as follows. The transparency frames 2, advanced in the direction D, reach the position 2d shown in a broken line. In this position, the assigned sliding area 25 has the position shown in a broken line designated by 25a. Subsequently with rotational movement in the direction of the arrow E, the leading edge is guided up into the clamping area 26.

A recess 27 is provided on the flank of the clamping area 26 opposite the sliding area 25. The clamping area 26 is of such a width that it is suitable for reception of part of transparency frame 2 with some clearance (play). As discs 23a and 23b are rotated in the direction of arrow E, the transparency frame 2, as can be seen, stands up, and reaches the position 2f from the intermediate position 2e.

The cam discs 23a and 23b are guided by recesses 28 in a bottom plate 29 of the receiving arrangement 17 projecting to at least the area of the receiving and deflecting recesses 27. Since the transparency frames arrive transversely in relation to this bottom plate 29, they will fit against said plate. With continued rotation of the cam discs 23a, 23b, plates 2 are freed from the clamping area 26. At the same time, plates 2 are seized by the guide area 30 of the cam discs, which are shaped in the form of a circular arc. The plates 2 are then pressed in the direction of the arrow F against a back-biasing support arrangement 31 acting in the direction G.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. Apparatus for stacking substantially flat articles that are rigid at least in a region of the edges of the articles, comprising:

receiving means, an article receiving shaft contained in said receiving means, said receiving means including an elastic back-biasing means for applying a counter-force to articles stacked in said receiving shaft;

feed-in means including driver means for moving said articles toward said receiving means;

said feed-in means and said receiving means being in-line to each other, a stacking position of said articles being transverse to a plane of the in-fed articles;

cam means rotatably disposed between said feed-in means and said receiving means for deflecting in-fed articles toward said receiving shaft;

rotation of said cam means being synchronized with movement of said feed-in means;

said cam means including at least one curved guide portion maintained against a deflected one of said articles and pressing said deflected articles into said receiving shaft;

an axis of rotation of said cam means being substantially parallel to an in-fed article, and transverse to a direction of movement of said feed-in means;

said cam means further including first and second cam plates separated from each other on the axis of rotation, each of said cam plates including a guide portion and receiving and deflecting recesses cut in said plates for said articles, said recesses having a width corresponding to the thickness of said articles and angularly displaced from said guide portion of said plates in a direction of rotation of said plates, said cam plates passing through recesses in a bottom portion of said receiving means and projecting up to at least an area of said receiving and deflecting recesses, said articles being thereby clamped by said cam plates at the recesses cut therein and oriented transversely to said bottom portion of each receiving means during rotation of said plates, the guide portion of said plates then urging said articles into said receiving means as said articles are released from said recesses.

2. An apparatus as in claim 1, wherein said receiving and deflecting recesses include a flat sliding area, and an immediately succeeding, groove-shaped clamping area; a flank of said clamping area, opposite said gliding area, including a bevel.

3. An apparatus as in claim 1, wherein said cam guide portions are shaped in the form of a circular arc.

4. An apparatus as in claim 1, wherein said cam plates include a plurality of receiving and deflecting recesses and a plurality of guide portions, said guide portions being curve-shaped, said receiving and deflecting recesses and said guide portions being distributed over a periphery of said discs.

* * * * *